United States Patent [19]
Kautzer et al.

[11] 4,285,109
[45] Aug. 25, 1981

[54] METHOD OF HYDRODYNAMIC FORMING

[75] Inventors: Ronald E. Kautzer, Malone; Donald M. Mueller, Fond du Lac, both of Wis.

[73] Assignee: D. Mueller Welding, Inc., Oakfield, Wis.

[21] Appl. No.: 683,502

[22] Filed: Apr. 5, 1976

[51] Int. Cl.³ .............................................. B23P 15/00
[52] U.S. Cl. ................................. 29/157 R; 29/421 R; 285/206
[58] Field of Search .......... 29/421 R, 156.4 R, 157 R; 228/157; 285/208, 209, 210, 206

[56] References Cited
U.S. PATENT DOCUMENTS

| | | | |
|---|---|---|---|
| 1,764,561 | 6/1930 | Gulick | 29/421 R |
| 2,715,377 | 8/1955 | Gary, Jr. | 29/421 R |
| 2,874,749 | 2/1959 | Brink | 285/206 |
| 3,024,525 | 3/1962 | Wisberger | 29/421 R |
| 3,807,009 | 4/1974 | Östbo | 29/421 R |
| 3,895,436 | 7/1975 | Summers et al. | 29/421 R |

Primary Examiner—Daniel C. Crane
Attorney, Agent, or Firm—Wheeler, House, Fuller & Hohenfeldt

[57] ABSTRACT

A hollow three dimensional metal article is formed by cutting two identical flat metal blanks, forming a hole in one of the blanks and upsetting the metal around the hole to accommodate the head of a threaded hollow stud having a sealing collar without interference when the blanks are in face contact, placing the blanks in face contact while the stud is in place, welding the metal blanks together continuously around the entire perimeter of the superimposed blanks, and forcing liquid under pressure through the hollow stud until a precise preset maximum pressure is reached to inflate the blanks to their final three dimensional form. Optional steps include cutting off the portion of the three dimensional form in which the stud and the opening for the stud are located and welding a standard fitting into the opening thus created and the provision of other portions of the three dimensional object with other attachments and fittings.

8 Claims, 8 Drawing Figures

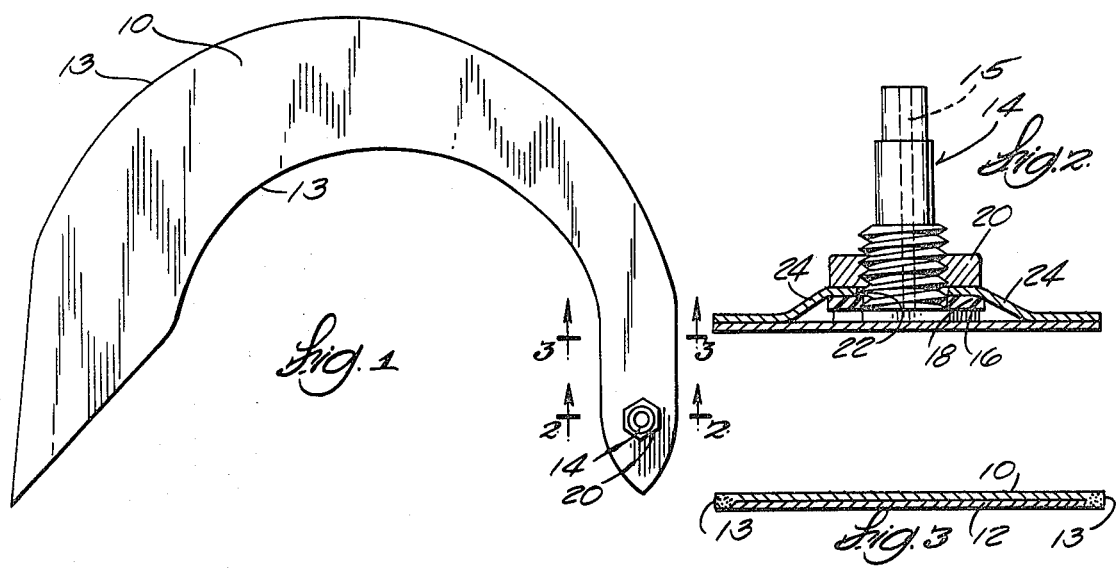
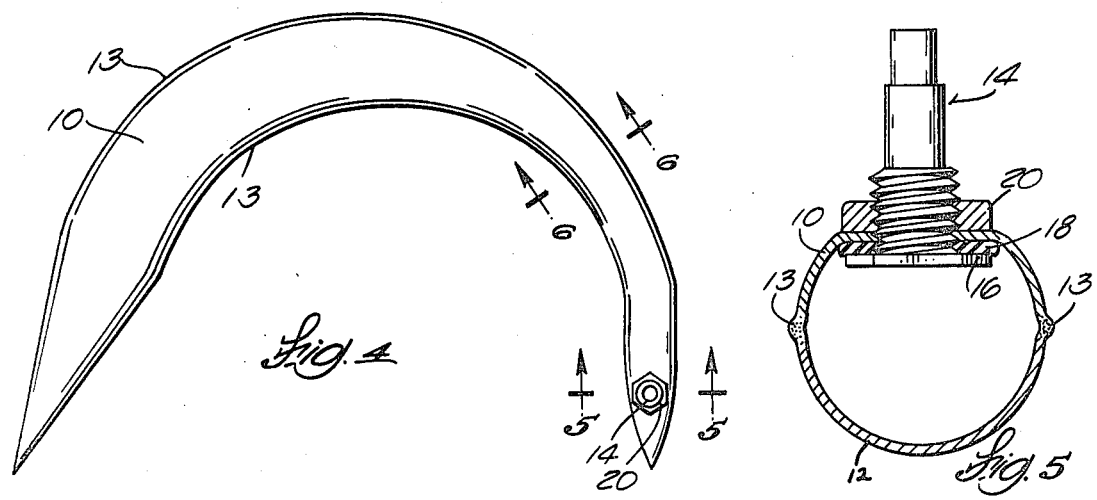
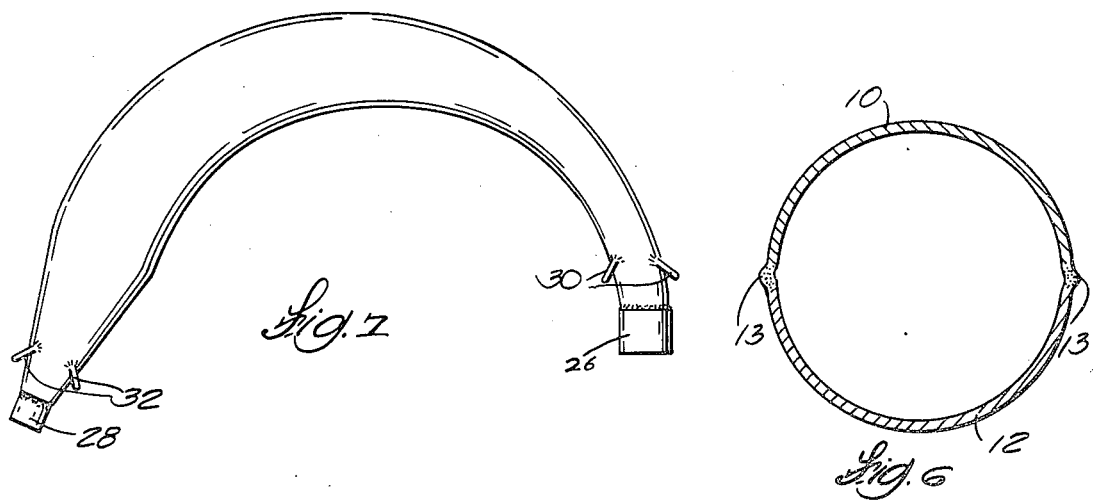

form with relatively little stretching of the material to the proper final configuration under the influence of pressure alone, without a confining cavity of the required shape, forming fluid passage means in one of the blanks, i.e. forming a hole in one of the blanks and upsetting the area around the hole to form a sealing seat for a hollow stud, inserting the hollow stud into the seat with a gasket, welding the entire edge of a pair of such superimposed blanks at least one of which contains such a stud, the weld extending around the entire periphery, applying fluid pressure to the interior of the unconfined blanks through the hollow stud until a precise preset maximum pressure is reached to inflate the blanks to their final three dimensional shape, and then performing any necessary finishing operations. In the specific embodiment shown in the drawings and described in the specification the device is an exhaust expansion chamber which is generally C shaped and which tapers at different angles at the inlet and outlet. In the case of this particular object the finishing operations consist of cutting off both ends of the three dimensional object, which incidentally removes the hollow stud from the device, and replacing the ends with steel collars welded in place to serve as attachment fittings to other exhaust system components. Obviously the nature of the final device will determine whether a hollow stud is to be retained or removed and what additional steps are required to finish the article, if any. The process is adaptable for manufacture of a great many complex shapes without the expense of creating a cavity to surround the article while fluid pressure is being applied to the interior. Producing dies with such cavities is exceedingly expensive and a different such die is required for every variation which it is desired to produce. Accordingly a major advantage of our method is that no such dies are required. The method is also believed to be a great deal simpler than other methods of producing similar articles.

The apparatus required for performing our method is relatively conventional. It consists of a source of fluid, preferably water, a pumping system for supplying the water to the hollow stud and thus to the interior cavity between the two flat plates welded around their entire perimeters, the pumping mechanism being capable of higher pressures than those to be applied in forming the particular articles, a pressure switch which may be preset to terminate the supply of fluid under pressure to the hollow stud when the pressure reaches the maximum which has been preset, a work surface on which to place the blanks as they are being formed into a three dimensional article (no clamps or other holding devices are required) and preferably a collecting system to recapture the water when the flexible hose from the pumping system is removed from the hollow stud so that the water may be returned to the tank for reuse. It will be evident that other fluids could be used in this process which might be either liquid or gaseous and that in some cases it might not be advantageous or desirable to recycle them, for instance if air were the fluid. On the other hand it might be even more advantageous to recover certain fluids which might be used, either because of expense or because of some undesirable property. Should that be the case, our method is adaptable to such needs. For instance, it would be possible to provide two openings with raised seats around them in different portions of one blank, or in the second blank, for a second stud. The additional stud could be used initially to supply fluid to inflate the article to its proper shape and later to supply a purging fluid to drive the first fluid out, with one stud being used to supply purging fluid and the other to receive it until such time as the initial fluid was entirely displaced. Other variations are of course possible. It is contemplated that our method is usable to form a great variety of three dimensional articles, especially those having unusual shapes, including gasoline tanks, oil tanks, and receptacles of all kinds. It is further contemplated that our method may be used to form shapes which are not complete in themselves but will be used as parts to form larger articles. In addition our method may form two or more three dimensional articles in a single forming operation, where the articles have open ends. For instance a pair of horn shaped articles could be formed from a pair of diamond shaped blanks, the final three dimensional article being separated at the center to form the two horns. Many other variations are possible. Because no expensive dies are required, running changes may be made quickly and efficiently should they become necessary and this is another major virtue of our method. Further advantages will be apparent from the detailed description which follows.

DESCRIPTION OF THE DRAWINGS

FIG. 1 is a plan view of two superimposed flat blanks which are shaped in two dimensions to form a three dimensional exhaust expansion chamber when inflated by fluid under pressure.

FIG. 2 is a cross-sectional view taken on the line 2—2 of FIG. 1.

FIG. 3 is a cross-sectional view taken on the line 3—3 of FIG. 1.

FIG. 4 is a plan view of the blanks of FIG. 1 after they have been shaped in three dimensions by introduction of a fluid under pressure between the two blanks.

FIG. 5 is a cross-sectional view taken on the line 5—5 of FIG. 4.

FIG. 6 is a cross-sectional view taken on the line 6—6 of FIG. 4.

FIG. 7 is a plan view similar to FIG. 4 showing an exhaust expansion chamber formed from the shaped blanks of FIG. 4 by cutting off the ends of the shaped blanks and attaching fittings thereto.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention, which is defined by the claims.

FIG. 1 is a plan view of a pair of flat ductile metal blanks 10 and 12 (See FIGS. 2 and 3) which have an identical two dimensional shape that is selected to cause blanks 10 and 12 to assume a predetermined three dimensional shape shown in FIGS. 4-6 when they are shaped by introduction of a fluid under a predetermined maximum pressure between the two blanks.

Blanks 10 and 12 are welded together in a continuous line 13 around their perimeter to prevent leakage of fluid from the interior of the two blanks. The fluid is introduced through a threaded hollow stud 14 which has an axial passage 15, an inner hexagonal flange 16 that engages a circular resilient sealing washer 18 and is drawn thereagainst by a nut 20. Stud 14 extends through a circular opening 22 in blank 10, and flange 16 and washer 18 fit in an upset portion or boss 24 around opening 22. Opening 22 and boss 24 are formed at a time when blanks 10 and 12 are separated, and stud 14 and washer 18 are inserted through opening 22 before blanks 10 and 12 are placed together as shown in FIGS. 1-3.

The method of this invention includes the following steps:

(A) Forming two flat blanks of ductile material;

(B) Forming fluid passage means in one of the blanks;

(C) Joining the flat blanks together face to face along a continuous line which forms a closed annular curve that encloses the fluid passage means;

(D) Introducing a fluid under pressure into the fluid passage means and terminating the input of fluid when a predetermined pressure is reached;

(E) Optionally removing the fluid from the interior of the resulting three dimensional object.

Subsequent processing steps may be involved depending on the particular form and purpose of the shaped object. In the illustrated embodiment, which is an exhaust expansion chamber for a small gasoline engine, both ends of the shaped object are cut off and cylindrical collars 26 and 28 (FIG. 7) and mounting eyes 30 and 32 are welded thereto. The exhaust expansion chamber is then ready to be connected to the engine exhaust system.

The fluid used in pressure forming the object is preferably water but other fluids could also be used, including gases such as air. A pressure source such as a pumping system is, of course, necessary to achieve the required fluid pressure, and an automatic pressure regulator should preferably be provided to terminate the flow of fluid when the pressure reaches a preset level. Alternatively, an operator can manually close a valve when the pressure reaches the desired level as indicated by a conventional pressure gauge on the fluid inlet conduit system. However, such fluid sources, pumps, gauges, and pressure regulators are conventional and therefore are not illustrated in the drawings or described in detail herein.

The flat blanks can be made of any suitable ductile material such as sheet iron, sheet steel, softenable plastic sheets, etc. The three dimensional shape of any given embodiment is determined in part by the shape of the connecting curve, which in the illustrated embodiment follows the edge of the blanks, but which may deviate from the periphery of blanks if desired to leave a flange or flanges, for instance for mounting the finished object. The ductility and dimensions of the material employed, and the fluid pressure used, also affect the final cross-sectional shape, which can vary from oval to round, etc. The final plan shape is also determined by the pressure and the two-dimensional shape of the line along which the two flat blanks are joined together. Joining the blanks is done preferably by welding, if iron or steel is used for the flat blanks, or by heat sealing or cementing if plastic is used for the flat blanks. Clearly the pressure used is related to ductility and strength at the time of forming. If heat or the like is used to affect ductility the pressure may be reduced.

We claim:

1. A method of producing a hollow three-dimensional article having ends from flat ductile material comprising the steps of:

(A) Forming two blanks from said flat ductile material;

(B) Forming fluid passage means in one of the blanks;

(C) Joining the blanks together face to face along a continuous joining line which forms a closed annular curve that encloses the fluid passage means;

(D) Introducing a fluid under pressure into the fluid passage means without any enclosing shape forming means, and (E) Removing the fluid from the interior of the resulting hollow three dimensional article; and characterized by the step of terminating the input of fluid when a predetermined pressure is reached, and further including the steps of (F) removing both ends of said article; and (G) attaching a collar to the portion of said article adjacent to each cut-off end.

2. The method of claim 1 wherein step (B) comprises the substeps of (1) forming an opening in one of said blanks, (2) upsetting a portion of said blank around said opening to form a boss; and (3) placing a hollow stud through said hole and in sealing engagement with said hole within said boss.

3. The method of claim 1 wherein said flat ductile material is metal and wherein in step (C) said blanks are joined together by welding.

4. The method of claim 1 in which in step (C) said closed annular joining curve follows the perimeter of said two blanks.

5. The method of claim 2 wherein said stud has a flange on one end and step (B) includes placing a resilient washer between said flange and the inner surface of said boss.

6. The method of claim 5 wherein said stud is threaded and also step (B) includes engaging a nut on the threads of said stud and tightening the nut to press said flange against said resilient washer to provide a fluid seal between said stud and said blank.

7. The method of claim 1 wherein said article has two ends, and further including the steps of (F) removing both ends of said article; and (G) attaching a collar to the portion of said article adjacent to each cut-off end.

8. The method of claim 7 wherein said fluid passage means is formed in at least one of the ends removed in step (F), whereby said fluid passage means is removed from said article along with the corresponding end.

* * * * *